Dec. 18, 1951 — L. S. WILLIAMS — 2,578,957
PIVOT AND BEARING
Filed March 29, 1946 — 2 SHEETS—SHEET 1
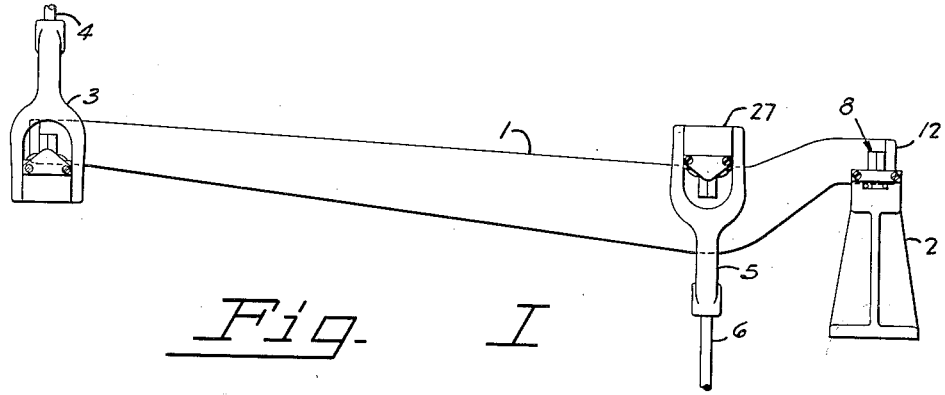
Fig. I
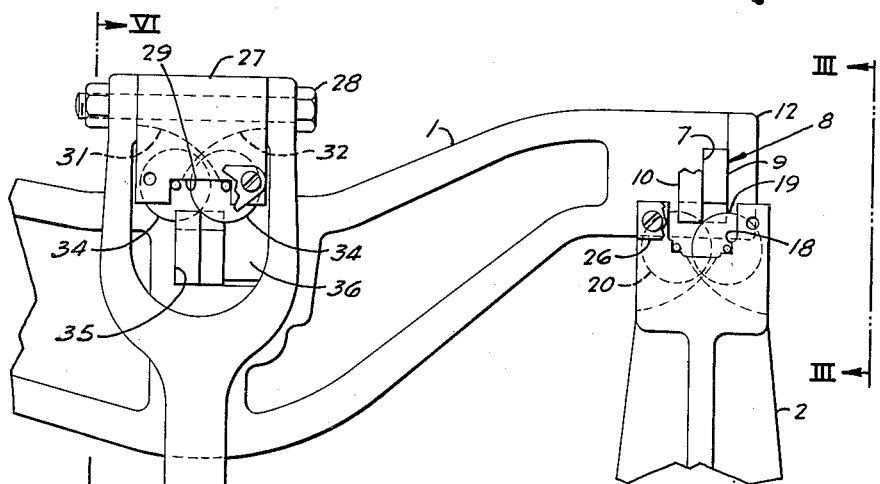
Fig. II
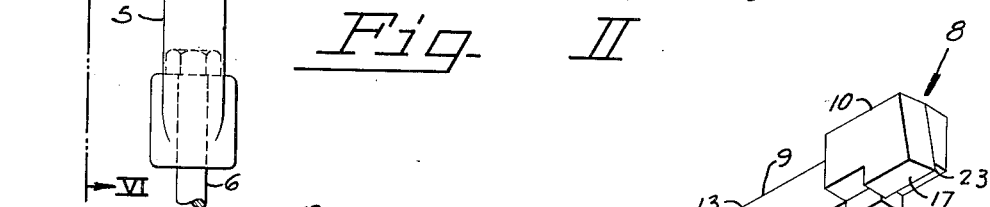
Fig. III
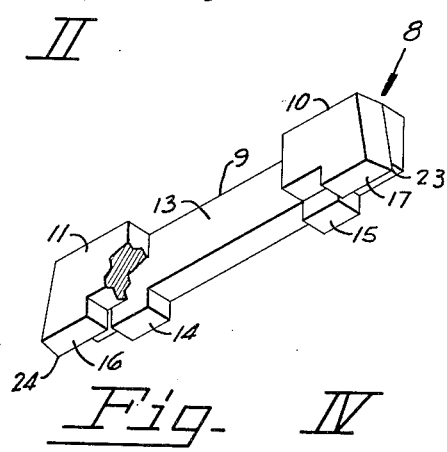
Fig. IV
INVENTOR.
Lawrence S. Williams
BY
Marshall and Marshall
ATTORNEYS Dec. 18, 1951  L. S. WILLIAMS  2,578,957
PIVOT AND BEARING
Filed March 29, 1946  2 SHEETS—SHEET 2
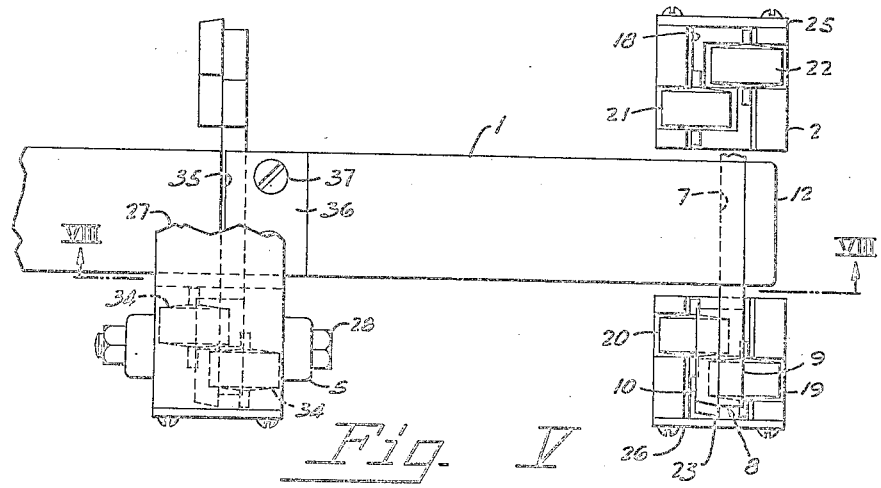
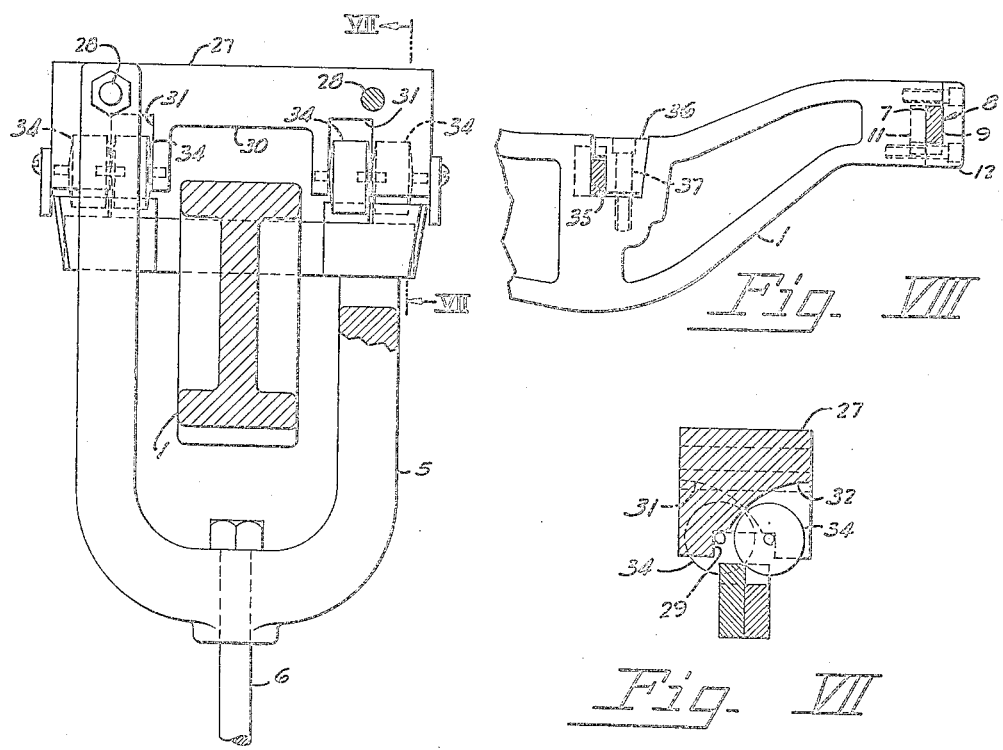
INVENTOR.
Lawrence S. Williams
BY
Marshall and Marshall
ATTORNEYS Patented Dec. 18, 1951

2,578,957

UNITED STATES PATENT OFFICE 2,578,957

PIVOT AND BEARING

Lawrence S. Williams, Toledo, Ohio, assignor to Toledo Scale Company, Toledo, Ohio, a corporation of New Jersey Application March 29, 1946, Serial No. 658,040

2 Claims. (Cl. 308—2)

The invention relates to improvements in pivots and bearings and in particular to an improved pivot whose pivot edge is very precisely located with respect to the lever or other member in which the pivot is mounted.

One of the problems encountered in the production of high quality weighing equipment is the difficulty of locating knife edges in levers so that the knife edges are precisely parallel to each other and at exactly the designed distances from each other.

The principal object of this invention is to provide a pivot for a lever of a weighing scale that may be very precisely located with respect to the lever.

Another object of the invention is to provide, in a pivot having several aligned knife edge portions, a flat surface which is precisely in line with the knife edge portions of the pivot.

These and other objects and advantages are attained according to the invention, an embodiment of which is illustrated in the accompanying drawings.

An improved pivot constructed according to the invention is generally of the laminate type— a pivot formed by welding or otherwise securing two generally flat pieces of hardened steel in face to face relation. The improved pivot consists of one relatively long bar of rectangular cross section having one face ground flat and having portions of the edge cut away leaving two laterally extending projections. The other laminate of the pivot is formed of two relatively short pieces each having generally the same cross sectional shape as the longer first piece. The short pieces are also cut to leave projections along one edge. The short pieces are assembled on the longer piece with the ground surfaces in face to face relationship and with the projections extending in the same direction but staggered along the length of the pivot. After being welded together or otherwise rigidly secured the ends of the projections are ground on a flat grinder to bring the lower surfaces of the projections into a common plane which is generally perpendicular to the ground interface between the portions of the pivot. Inasmuch as the shorter added parts of the pivot are positioned at the ends of the longer first piece, a considerable portion of its ground surface is left exposed which ground surface is precisely in the plane of the knife edges formed on the lower ends of the projections. The exposed ground central portions of the pivots may be clamped against accurately machined surfaces of the lever to locate the pivots at their proper distances.

A preferred embodiment of the invention is shown in the accompanying drawings.

In the drawings:

Figure I is a side elevation of an intermediate lever of a weighing scale.

Figure II is an enlarged fragmentary side elevation with parts broken away of the fulcrum end of the intermediate lever.

Figure III is an end elevation of the fulcrum end of the lever as seen from the line III—III of Figure II.

Figure IV is a perspective view of the improved pivot.

Figure V is a plan, with parts broken away, of the fulcrum end of the intermediate lever.

Figure VI is a vertical section taken substantially along the line VI—VI of Figure II.

Figure VII is a vertical section taken along the line VII—VII of Figure VI.

Figure VIII is a vertical section taken substantially along the line VIII—VIII of Figure V.

These specific figures and the accompanying description are intended merely to illustrate the invention but not to impose limitations on the claims.

The improved pivot may be used for any or all of the pivots of a lever 1 of a weighing scale. The lever 1 which is shown as an intermediate lever is fulcrumed on a fulcrum stand 2, is connected by pivot and bearing assemblies to a stirrup 3 suspended from a steelyard rod 4 to which is attached to load counterbalancing mechanism and pivotally supports a stirrup 5 from which a steelyard rod 6 connected to a load receiver is suspended.

The fulcrum end of the intermediate lever 1 is shown at an enlarged scale in Figure II. The fulcrum end of the lever 1 is provided with an L-shaped notch 7 one side of which is perpendicular to a line (known as the pivot line) extending longitudinally of the lever and passing through the several pivots and is accurately located longitudinally of the lever. The downwardly directed surface of the L-shaped notch 7 is also accurately located with respect to the pivot line of the lever. A laminated pivot 8 (see also Figure IV) comprising a full length portion 9 and short end portions 10 and 11 is clamped in the L-shaped notch 7 with the side of the notch extending perpendicular to the pivot line of the exposed central section of the full length portion 9 in contact with the lever 1. The side of the notch 7 thus becomes a reference surface for locating the pivot 8 with respect to the lever 1. A cap 12 screwed to the end of the lever 1 securely holds the pivot 8 in place.

The full length portion 9 of the pivot 8, as seen in Figure IV, has its large flat side 13 ground flat and smooth and has its lower edge cut away to leave a pair of projections 14 and 15. The end portions 10 and 11 are also notched to leave projections 16 and 17. The juxtaposed surfaces of the full length section 9 and the short end sections 10 and 11 are all smooth and flat so that when the end portions 10 and 11 are welded in place the inner surfaces of the projections 14, 15, 16 and 17 are precisely coplanar. After the end portions 10 and 11 are welded in place the ends of the projections are ground so that the surfaces of the ends are coplanar, substantially parallel to the opposite surface of the full length portion of the pivot 8 and perpendicular to the interface between the pivot portions. This method of construction provides a true turning axis by insuring that the intersections of the sides and bottom surfaces of the projections 14, 15, 16 and 17 are accurately aligned and are also accurately in line with the exposed central section of the pivot.

When the ground surface of the pivot exposed between the welded on end portions 10 and 11 is clamped against the vertical face of the L-shaped notch 7 the pivot is accurately located with respect to the lever.

The top of the fulcrum stand 2 is provided with a transverse notch 18 extending across both portions of the fulcrum stand. The fulcrum stand is also notched in a direction parallel to the lever to provide operating space for hardened steel rollers 19, 20, 21 and 22 whose integrally formed axles are journaled in the corners of the notch 18. The rollers 20 and 21 located adjacent the sides of the lever 1 bear against the knife edge formed at the corner of the projections 14 and 15, while the rollers 19 and 22 bear against the corners of the projections 16 and 17. The outer ends of the short pivot sections 10 and 11 are beveled to provide points 23 and 24 which cooperate with thrust plates 25 and 26 screwed or otherwise secured to the outer vertical surfaces of the fulcrum stand 2.

This construction provides a very precisely located pivoting axis or turning point which is also very free from friction. The method of making the pivot by welding the portions of previously ground pivot stock together and subsequently grinding the bottom surface of the combined sections provides precisely aligned knife edges, while the use of the hardened rolls minimizes the friction because the rolls can turn to accommodate any residual lack of truth in the knife edges.

The same type of construction is used for the load and power pivots of the intermediate lever 1. Since the stirrup constructions are identical, only the load supporting stirrup is specifically described. The stirrup is shown in side elevation in Figure II and in front elevation partly sectioned in Figure VI. The stirrup 5 is a U-shaped member each of whose arms is bifurcated to straddle a bearing block 27 which is held in the stirrup 5 by means of a pair of bolts 28. The lower surface of the bearing block 27 has a groove 29 along its length, a relatively wide and deep transverse notch 30 midway of its length to accommodate the width of the lever 1 and two sets of side notches 31 and 32 adapted to receive hardened steel bearing rolls 34. The load pivot of the lever 1 is exactly similar to the fulcrum pivot and consists of a laminated pivot having an exposed central section which can be accurately located against the bottom and side of a notch 35 cut in the lever. A wedge block 36 drawn down by screws 37 serves to hold the pivot securely in position. The side of the notch 35 against which the pivot rests is square with the pivot line of the lever and is, therefore, parallel with the vertical side of the L-shaped notch 7 in the fulcrum end of the lever 1. These surfaces are cut in the same member, i. e. the lever, and may be very precisely located with respect to each other. The knife edges of the pivots are precisely in line with the ground exposed surface at the center of the laminated pivots so that when the ground surfaces are clamped against the vertical sides of the notches the knife edges are located to the same degree of accuracy that the sides of the notches are located. This method of construction permits the pivots to be interchanged without affecting the lever ratio of the lever or of requiring extremely precise dimensional control in the manufacture of the pivots.

In order that the full advantage of the improved pivots may be realized it is preferable that all the pivots of a lever be similarly constructed. However the improved pivot may be used to advantage even though the power pivot may be of conventional construction. This follows because the multiplication ratio of the lever is determined by the ratio of the pivot distances and because of the relatively great distance between the fulcrum and the power pivot, a small error in positioning the power pivot will not cause as great an error in multiplication as when the same absolute dimensional error occurs in the positioning of the load pivot with respect to the fulcrum.

By increasing the precision with which knife edge lines may be located with respect to the lever, it is possible to reduce the load pivot to fulcrum pivot distance to a relatively small amount and thus secure a relatively great multiplication ratio in a single lever.

Various modifications of the invention may be devised for holding the improved pivot and locating it in a lever without departing from the spirit and scope of the invention.

Having described the invention, I claim:

1. In a lever and pivot assembly for a weighing scale, in combination, a lever having a pivot line and a reference surface perpendicular to the pivot line, a pivot member that has a flat face secured against the reference surface and that has portions extending from the sides of the lever, projections extending from the pivot member, pivot edges formed on the projections and in the plane of the flat face of the pivot member, auxiliary portions each having a flat face that are attached to the extending portions of the pivot member with the flat faces of the auxiliary portions juxtaposed to the flat face of the pivot member, and pivot edges formed on the auxiliary portions in the plane of the flat faces and in line with the pivot edges on said projections.

2. A lever and pivot assembly according to claim 1 in which the reference surface in the lever is a side wall of a notch cut in the lever.

LAWRENCE S. WILLIAMS.

REFERENCES CITED

The following references are of record in the file of this patent:

UNITED STATES PATENTS

| Number | Name | Date |
|---|---|---|
| 1,109,838 | Hedman | Sept. 8, 1914 |